Dec. 14, 1926.

D. H. YOUNG 1,610,842

TOOTHED IMPLEMENT

Filed July 31, 1924

Inventor,
D. H. Young, by
G. C. Kennedy,
Attorney.

Patented Dec. 14, 1926.

1,610,842

UNITED STATES PATENT OFFICE.

DANIEL H. YOUNG, OF MANCHESTER, IOWA.

TOOTHED IMPLEMENT.

Application filed July 31, 1924. Serial No. 729,296.

My invention relates to improvements in toothed implements, and the object of my improvement is to supply a device of this class which is light, portable, for manual use, and in construction devised for superior operation under all its conditions of employment.

With the foregoing object in view, the invention resides in the combination and arrangement of parts and in the details of construction hereinafter described and claimed, it being understood that changes in the precise embodiment of invention herein disclosed can be made within the scope of what is claimed without departing from the spirit of the invention.

Figure 1:
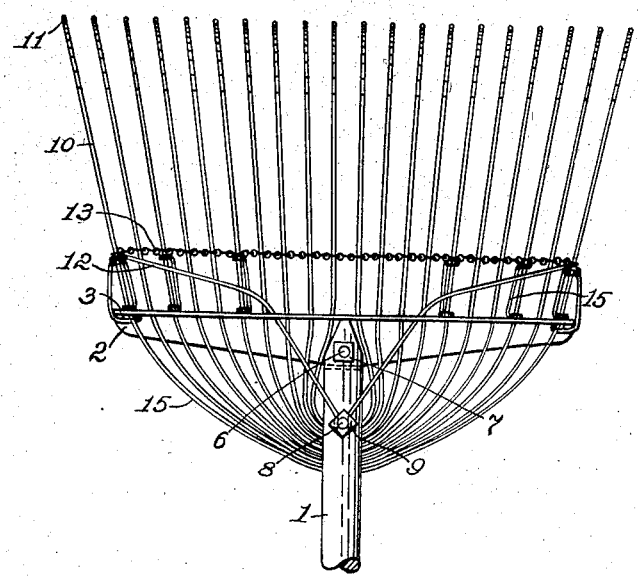
Figure 2:
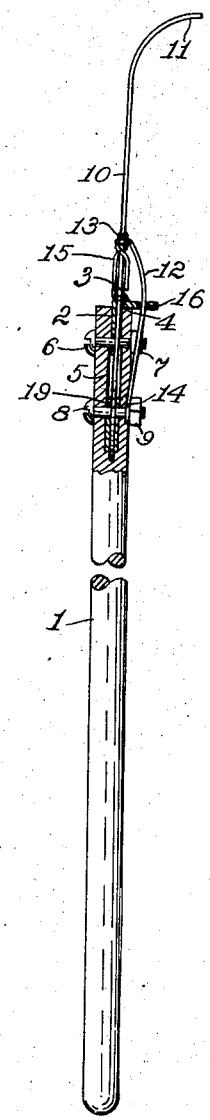
Figure 3:
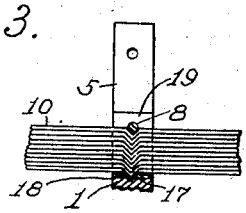
Figure 4:
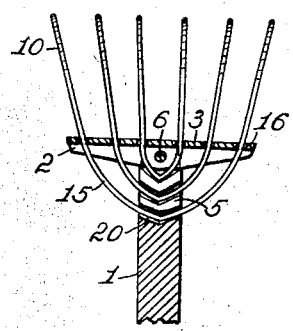
Figure 5:
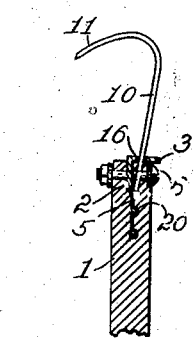

In the annexed drawings, Fig. 1 is an under plan of the device of my invention, with a part of the handle broken away. Fig. 2 is a view thereof partly in side elevation and partially in longitudinal section, with parts broken away. Fig. 3 is a detail view showing the nested bent parts of the U-shaped teeth or tines of the implement as removably secured to the handle. Fig. 4 is an upper plan of a modification of the implement to adapt it for use as a hand cultivator, with parts sectioned or broken away, and Fig. 5 is a view of the latter device sectioned longitudinally as seen from one side.

Similar numerals of reference denote similar parts throughout the several views.

The implement shown in Figs. 1 to 3 inclusive is particularly designed and constructed for use as a broom for sweeping lawns, where elastic tines are desirable. The device has an elongated handle 1 one end being longitudinally split as by a saw kerf at 5 for a short distance to receive in said kerf the web part 2 of an angle-bar crosspiece whose flange 3 has a longitudinal row of holes 4. Both the handle at said kerf and the web 2 are apertured in alinement to receive a bolt 6 secured by a nut 7 to fixedly clamp said crosspiece to the handle. The root part of said kerf beyond the crosspiece web 2 is made wide enough to seat therein a doubled plate 19 (see Fig. 3) whose members are separated enough to receive engagingly between them a plurality of opposed like elastic rods 10 in contact in parallel, and whose middle parts are bent to small right angles 18 which nest together, although the bends can be made with any other suitable angle for proper nesting engagements. The medial bend of the doubled plate 19 has an aperture 17 to permit of receiving the angle or bend 18 on one of the rods 10 engagingly or interlockingly, and the handle and said plate members have alined apertures to receive a bolt 8 secured by a nut 9, the shaft of the bolt traversing the hollow of the bend 18 in a rod 10 to lock the assemblage of rods in engagement with each other between the members of said plate, so that none of the rods are permitted movements relative to the plate 19 or the handle 1 whether lengthwise or rockingly.

The tines or prongs of the device as shown in Fig. 1 at 11 are the end portions of said rods 10 curved toward the crosspiece 2 and divergently passed through the apertures 4 thereof with their free terminals curved downwardly. The curvate parts 15 of the rods between the handle connection thereof and said crosspiece are elastic and as the rods are loosely movable in the apertures 4, endwise stresses upon their free curved ends cause the curved parts 15 to yield and allow some longitudinal relative movement to the tine or tines stressed, as in passing over some raised portion of the surface scraped over or some small obstruction in the path of movement of the tines. Because of this elastic adjustment of the tines in yielding longitudinally, the ground and the roots of grass are not dug up or displaced when the tool is used as a flexible lawn broom, as is often the case when a rake having the usual rigid teeth is used.

As the tines 10 are relatively long, elastic and made of small gage wire, it is necessary to provide some means for connecting them together flexibly at a location in advance of the crosspiece 2 and in supporting them in said location. I therefore furnish a chain 13 certain equidistant links of which are loosely traversed by said tines 10. To hold the chain in a parallel relation to the crosspiece 2 and support the tines at this location I supply wire struts 15 having terminal eyes through which certain tines 10 are passed, and which are engaged between the crosspiece flange 3 and said chain, the latter being prevented from shifting toward the ends of the tines at 11 because of the divergency of the tines from each other beyond the chain. Struts 15 at the sides of the crosspiece are lengthened and end connected by loops to the end tines on the opposite face of the flange 3. To supply additional support to the chain when desired, I use a pair of bent or curved divergent wire rods 12 having their middle parts passed through apertures 16 in the flange 3 and their ends below said crosspiece provided with terminal eyes traversed by the two end tines 10. The other ends of the rods 12 converge toward the bolt 8, crossing each other, and are secured against the handle by compression of the nut 9, and when the nut is loosened, the rods 12 may be adjusted in position longitudinally along the tines or prongs 10 of the device to support the chain 13 in another position.

It should be observed, that the loose mounting of the tines 10 in the apertures 4 together with the yieldable elastic bent or curved parts 15, allow the tines to bend in any direction freely under hard usage, as the parts 15 give elastically to permit such action without injury to the tines or to an object passed over, yet the curved terminals 11 may hold to the surface traversed to gather up loose detritus and propel it to a place of collection.

The device as modified and shown in Figs. 4 and 5, preserves the same principles of construction, but the tines are fewer and of heavier wire, so as to be appropriate for use as a hand cultivator. The bends of the U-shaped tines 10 are seated in bored openings made slopingly in the handle 1 intersecting the middle kerf, and which effectually interlocks them as against displacement or rotation. The tines are passed through apertures 16 in the crosspiece flange 3 somewhat spaced from the web thereof to thus tilt the tines as shown in Fig. 5 for better clearance while cultivating.

Having described my invention, what I claim as new, and desire to secure by Letters Patent, is:

1. A device of the character described, comprising a handle, a plurality of tines connected intermediately to the handle, and a guiding-bar secured to the handle, said tines being curved toward and loosely mounted across the guiding-bar for longitudinal free play relative thereto by yielding of their curved parts.

2. A device of the character described, comprising a handle, a plurality of elastic tines connected intermediately to the handle, thence curved forwardly, a chain connecting device having links loosely mounted upon said tines and movable longitudinally along the tines to vary their spacial relation, and a deformable adjusting device medially connected to said handle back of said guiding-bar and end-connected to opposite parts of said chain connecting-device to hold the latter in an adjusted position flexibly and longitudinally upon said tines.

3. A device of the character described, comprising a handle having a longitudinal kerf at one end, a plurality of elastic tines positioned in said kerf intermediately, all the tines being bent intermediately with a crimp and the tines arranged in contact and parallel with the said crimps nested, means for locking said tines as nested to the handle, and a guiding-bar fixed across the handle, said tines being curved toward and loosely mounted across the guiding-bar for free longitudinal adjustments at such curved parts and across the guiding-bar when force is applied to the free ends of the tines.

In testimony whereof I affix my signature. Waterloo, Iowa, June 30, 1924.

DANIEL H. YOUNG.